US012754160B2

(12) United States Patent
Wang et al.

(10) Patent No.: US 12,754,160 B2
(45) Date of Patent: Oct. 6, 2026

(54) SELF-CALIBRATED ELECTROCHEMICAL SENSORS

(71) Applicant: VIRGINIA COMMONWEALTH UNIVERSITY, Richmond, VA (US)

(72) Inventors: Xuewei Wang, Henrico, VA (US); Nafesa Adil, Chantilly, VA (US)

(73) Assignee: Virginia Commonwealth University, Richmond, VA (US)

( * ) Notice: Subject to any disclaimer, the term of this patent is extended or adjusted under 35 U.S.C. 154(b) by 113 days.

(21) Appl. No.: 18/682,532

(22) PCT Filed: Aug. 29, 2022

(86) PCT No.: PCT/US2022/041841
§ 371 (c)(1),
(2) Date: Feb. 9, 2024

(87) PCT Pub. No.: WO2023/034192
PCT Pub. Date: Mar. 9, 2023

(65) Prior Publication Data

US 2024/0295524 A1 Sep. 5, 2024

Related U.S. Application Data

(60) Provisional application No. 63/238,979, filed on Aug. 31, 2021.

(51) Int. Cl.
*G01N 27/333* (2006.01)
*G01N 27/30* (2006.01)
*G01N 27/416* (2006.01)

(52) U.S. Cl.
CPC ....... *G01N 27/3335* (2013.01); *G01N 27/301* (2013.01); *G01N 27/4163* (2013.01)

(58) Field of Classification Search
CPC ............. G01N 27/333; G01N 27/3335; G01N 27/301; G01N 27/4163; G01N 27/401; G01N 27/4035
See application file for complete search history.

(56) References Cited

U.S. PATENT DOCUMENTS 4,312,734 A * 1/1982 Nichols .................. G01N 27/36
204/435
4,654,127 A * 3/1987 Baker .................... G01N 33/49
205/792

(Continued)

FOREIGN PATENT DOCUMENTS

KR 2018-0044040 A 5/2018

OTHER PUBLICATIONS

Chapter 7, Calibration Theory, of the NICO2000 Beginners Guide to ISE Measurement, Feb. 2020, https://web.archive.org/web/20200220200436/https://www.nico2000.net/Book/Guide8.html (Year: 2020).*

(Continued)

*Primary Examiner* — Alexander S Noguerola
(74) *Attorney, Agent, or Firm* — WCF IP

(57) ABSTRACT

Provided herein is a self-calibrating electrochemical sensor, which includes an indicator electrode, a reference electrode, and a calibration bridge that connects the indicator electrode and the reference electrode. The calibration bridge has an ion-conducting or electron-conducting phase that establishes a pre-measuring baseline electrochemical signal. When the sample to be tested is introduced to the sensor, the change in the electrochemical signal relative to the baseline is used to detect and/or quantify the analyte in the sample. The built-in calibration phase does not need to be removed when the sample is tested.

30 Claims, 4 Drawing Sheets

(56) References Cited

U.S. PATENT DOCUMENTS

| | | | | |
|---|---|---|---|---|
| 4,871,439 | A * | 10/1989 | Enzer | G01N 27/4165 204/411 |
| 5,098,547 | A * | 3/1992 | Bryan | G01N 33/0006 204/415 |
| 5,236,570 | A * | 8/1993 | Ma | G01N 27/3335 435/817 |
| 6,554,982 | B1 | 4/2003 | Shin et al. | |
| 6,730,201 | B1 * | 5/2004 | Kuhlman | G01N 27/27 204/418 |
| 9,347,907 | B2 | 5/2016 | Duimstra et al. | |
| 2001/0051109 | A1 * | 12/2001 | Anderson | C12Q 1/001 435/12 |
| 2009/0288949 | A1 * | 11/2009 | Yeon | G01N 27/301 204/407 |
| 2015/0047978 | A1 | 2/2015 | Mathur et al. | |
| 2015/0101938 | A1 | 4/2015 | Bychkova et al. | |
| 2016/0033438 | A1 * | 2/2016 | Lan | G01N 27/301 205/780.5 |
| 2019/0195824 | A1 * | 6/2019 | Speck | G01N 27/301 |
| 2020/0264123 | A1 * | 8/2020 | Gahlings | G01N 27/302 |
| 2020/0363367 | A1 | 11/2020 | Mousavi et al. | |

OTHER PUBLICATIONS

Bihar et al., "A fully inkjet-printed disposable glucose sensor on paper." npj Flexible Electronics (2018) 30 (Year: 2018).*

Galiullin et al: "Evaluation of Ionic Liquids Based on Amino Acid Anions for Use in Liquid-junction Free Reference Electrodes", Electroanalysis, vol. 31, 2019.

Vanamo et al: "Electrochemical control of the standard potential of solid-contact ion-selective electrodes having a conducting polymer as ion-to-electron transducer", Electrochimica Acta, vol. 122, p. 316-321, Nov. 6, 2013.

* cited by examiner

406A

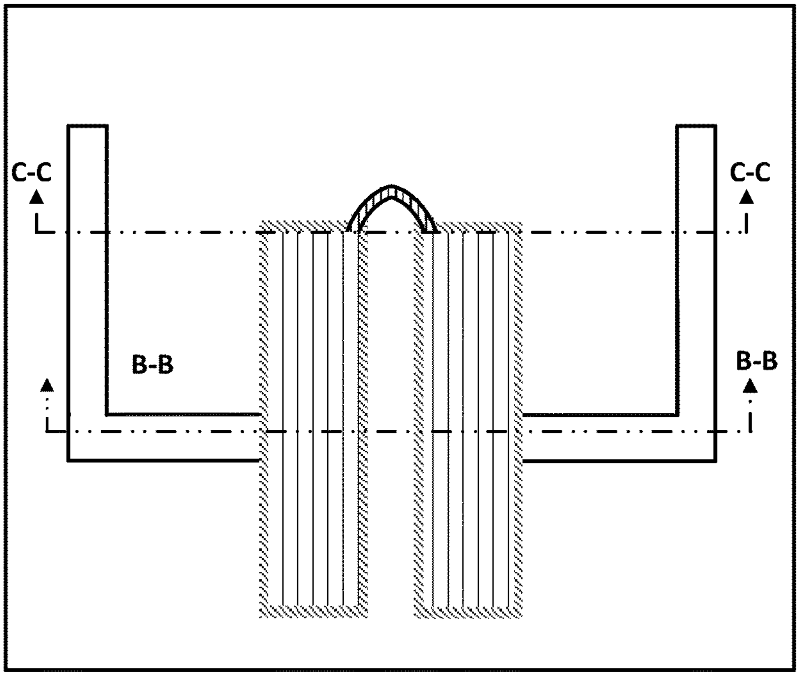
Fig. 5A
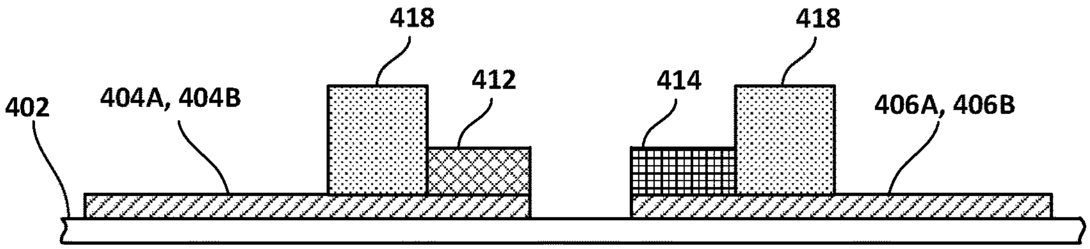
Fig. 5B
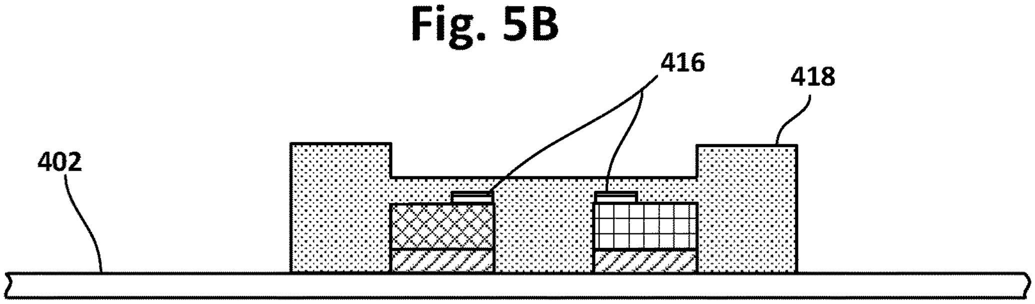
Fig. 5C
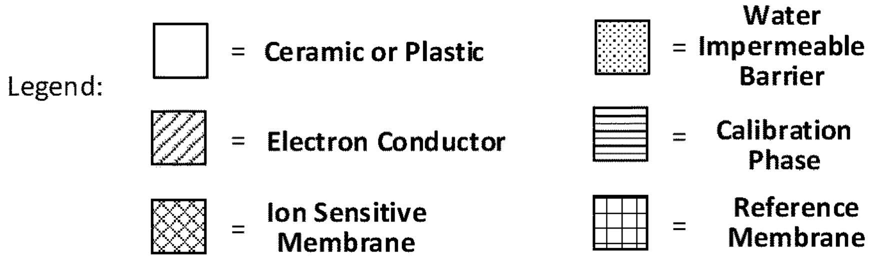

SELF-CALIBRATED ELECTROCHEMICAL SENSORS

CROSS REFERENCE TO RELATED APPLICATIONS

This application claims the benefit under 35 U.S.C. § 119 (e) of U.S. Provisional Patent Application No. 63/238,979, filed Aug. 31, 2021, which is hereby incorporated by reference in its entirety.

TECHNICAL FIELD

Embodiments generally relate to electrochemical sensors measuring of analytes, and particularly ion-selective electrodes (ISE) measuring apparatuses and methods providing improved point-of-use repeatability and consistency of measurements.

BACKGROUND

Ion-selective electrodes have been seen as a gold standard technology for electrolyte detection (e.g., $K^+$, $Ca^{2+}$, $Li^+$, $Cl^-$), and have been used for a range of other ionic and even neutral analytes (e.g., creatinine, CO2). The ion-selective electrodes have been commercialized in automated blood analyzers in hospital, clinical, and emergency transportation settings for decades. However, an inherent and costly limitation of ion-selective electrodes exists, namely, the requirement of calibration by a standard solution at the point of use. The requirement is due in significant part to sensor-to-sensor variations, for which solution via fabrication process improvements has not been practical. One or more calibration solutions containing standard concentrations of analyte need to be delivered to the sensors via complicated fluidic handling systems to perform calibration at the point of use. Fluid and gas handling systems also need to wash the channel and deliver the real sample after the calibration step. The calibration costs effectively prohibit for applications in resource-limited settings such as home use and wearable use. The complicated fluidics system can often require a higher volume of sample, which hinders the sensor application in testing small-volume samples such as a drop of blood collected from fingerstick.

Accordingly, what is needed is an ion-selective electrode sensor that has no requirement for costly, time consuming point-of-use calibration, requires low sample volumes, has low purchase cost, and provides acceptable measurement accuracy, reliability, ease of use.

In addition to ion-selective electrodes, various other electrochemical sensors also suffer from large sensor-to-sensor variation and the resulting low precision in chemical/biochemical analysis. One example is electrochemical glucose sensors for diabetes management. Another example is aptamer-modified electrodes for electrochemical detection of aptamer targets (Sci Transl Med. 2013 Nov. 27; 5 (213): 213ra165. doi: 10.1126/scitranslmed.3007095).

Electrochemical glucose sensors and aptasensors are only two examples, as a wide range of other electrochemical sensors will benefit from a method that improves measurement consistency and resulting precision of multiple sensors.

SUMMARY

Embodiments include new ISE structures and arrangements, and new ISE-based processes for self-calibrated measuring of electrolytes and other ionic and non-ionic analytes. Embodiments provide inherent device-to-device consistency in measuring electrolytes and other analytes, out-of-the-box, without fluidics, actuators, or user interventions. Embodiments also include other electrochemical sensor structures and arrangements with a built-in self-calibration design to improve the device-to-device consistency in measuring the corresponding analytes such as glucose, lactate, and cholesterol.

Structure according to one or more embodiments includes a micro-tunnel, filled with an ion-conducting phase or an electron-conducting phase and extending between an indicator electrode and a reference electrode. This structure, according to one or more embodiments, creates a baseline electrochemical signal prior to a sample, e.g., blood, being introduced. This can provide, among other features and advantages, inherent compensation for all device-to-device variances in electric signals that, in conventional electrochemical sensors, necessitate calibration immediately prior to uses. Variances that are mitigated, which would cause, absent employing costly, point-of-use conventional calibration processes, include, for example, variance of devices' electron conductors, ion-to-electron transducers, and of the various interfaces of the indicator electrodes and reference electrodes.

An example self-calibrated electrochemical (SCE) sensor according to various general embodiments can include an indicator electrode device, hereinafter referred to, for brevity, as "the indicator electrode," that includes an ion-sensitive phase coupled to a first electron conductor and a reference electrode device, hereinafter referred to, for brevity, as "the reference electrode," that includes a reference phase coupled to the second electron conductor. In a general embodiment, the ion-sensitive phase can comprise a water-immiscible oil or polymer or polymerized oil that can carry ionophores and ion exchangers. The ion-sensitive phase can be coupled to a first electron conductor and can form a sample first contact surface configured to interface an aqueous sample. The reference electrode in accordance with a general embodiment, can comprise a reference phase that can be coupled to a second electron conductor to provide a relatively sample-independent potential. The reference phase can form a sample second contact surface configured to interface the aqueous sample. In accordance with a general embodiment, a SCE sensor includes an ion-conducting phase channel, or an electron-conducting phase channel coupled to the ion-sensitive phase and the reference phase and configured to establish a baseline electrochemical signal prior to the introduction of the sample.

An example self-calibrated planar electrochemical sensor includes a solid state sensing membrane, comprising a metal first layer element supported above a first area of a substrate, a first solid contact layer element, supported above the metal first layer element, and a first plasticized polymer membrane, supported above the first solid contact layer element. The first plasticized polymer membrane can comprise a first plasticized polymer layer that carries a distribution of ionophores and ion exchangers. The example self-calibrated solid state electrochemical sensor can also include a solid state reference membrane, which comprises a metal second layer element, supported above a second area of the substrate, adjacent the first area, a second solid contact layer element, supported above the metal second layer element, and a second plasticized polymer membrane, supported above the second solid contact layer element and comprising a second plasticized polymer layer that carries a hydrophobic electrolyte. A solid self-calibration phase, supported at least in part above an area of the substrate adjacent the first area and the second area, comprises a distribution of ions within a hydrogel-based line or a metal wire coupled to the first plasticized polymer membrane and to the second plasticized polymer layer.

An example SCE sensor is a glucose sensor including a glucose-sensitive electrode, a reference electrode, and a calibration bridge that couples the outer surface of the glucose-sensitive electrode and the reference electrode. The calibration bridge includes a solution, or hydrogel or polymer that contains a known concentration of glucose. The calibration bridge provides a baseline current that serves for self-calibration purpose. The current change after the sample introduction can be used for quantifying glucose in samples such as blood.

This Summary identifies example features and aspects and is not an exclusive or exhaustive description of disclosed subject matter. Whether features or aspects are included in or omitted from this Summary is not intended as indicative of relative importance of such features or aspects. Additional features are described, explicitly and implicitly, as will be understood by persons of skill in the pertinent arts upon reading the following detailed description and viewing the drawings, which form a part thereof.

BRIEF DESCRIPTION OF THE DRAWINGS

FIG. 5A is a graphic that shows a top elevation view of an example configuration of an all-solid-state, SCE sensor according to one or more disclosed embodiments; FIG. 5B shows features of the FIG. 5A example configuration as viewed from the figure's cross-cut projection BB-BB; FIG. 5C shows features of the FIG. 5A example configuration as viewed from the figure's cross-cut projection CC-CC.

DETAILED DESCRIPTION

Figure 1A:
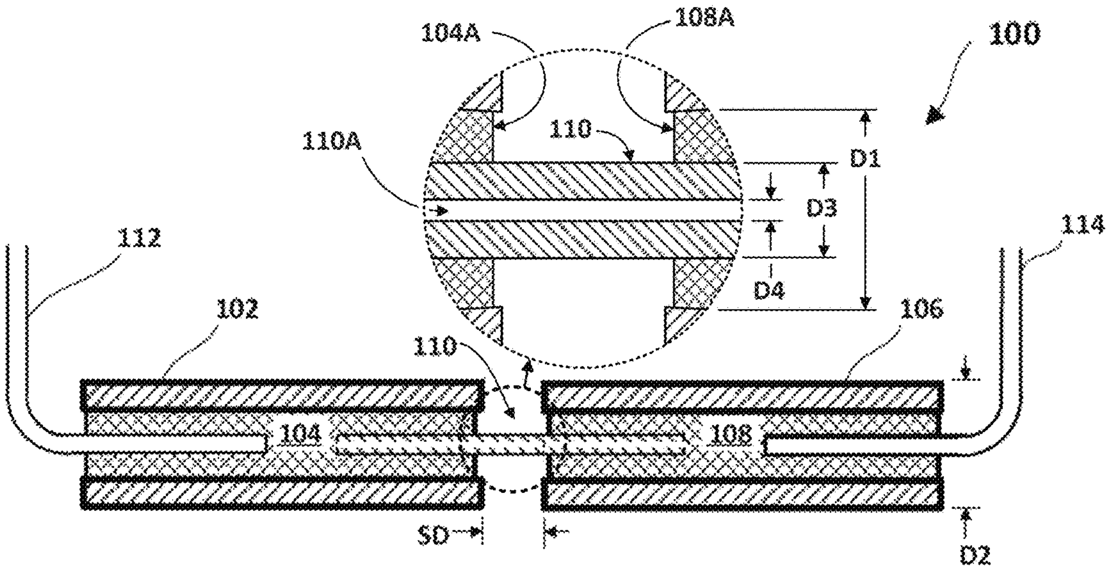
FIG. 1A is a graphic that shows, from a two-dimensional cross-cut projection, an example arrangement of structure of a liquid phase self-calibrated electrochemical (SCE) sensor according to one or more disclosed embodiments.

For purposes of description, the word sequence "self-calibrated electrochemical" will hereinafter be alternatively recited as "SCE," which is an arbitrary abbreviated form having no intrinsic meaning as used in the disclosure.

As used herein, the "indicator electrode" is an electrode that is responsive to an analyte. Any known "ion-selective electrodes (ISEs)" can be considered as one type of indicator electrode. In some embodiments, an indicator electrode comprises an electron conductor as the substrate electrode and an "ion-sensitive phase." The electron conductor of the indicator electrode can be of any shapes such as wire, rod, needle, array, and planar layer. The possible material of the electron conductor includes but is not limited to metal, carbon-based materials, semiconductor, and conductive polymers. The "ion-sensitive phase" is a phase that exhibits electrochemical response toward ionic analytes. The ion-sensitive phase can be made of any materials that are not fully miscible with water. Representative example materials include plasticizer, plasticizer mixed with nanoparticles, plasticizer mixed with polymers, water-immiscible organic solvent, water-immiscible organic solvent mixed with polymers, silicone rubber, photocured polymer, and polymethacrylate. Example configurations of the ion-sensitive phase include deposited membrane and segment of organic solvent, plasticizer, polymer, or organic gel. The ion-sensitive phase can be directly coated onto the electron conductor. There can also be an ion-to-electron transduction layer between the electron conductor and the ion-selective membrane to provide better and stable contact. The ion-to-electron transduction layer can be "liquid contact." Representative examples of liquid contact include, but are not limited to, an aqueous solution containing salts and a hydrogel containing salts. According to various embodiments, salts of the primary ion (the analyte ion) may be preferred. In one or more embodiments, chloride salts may be preferred when the electron conductor is a silver/silver chloride wire. The ion-to-electron transduction layer can also be "solid contact." Representative solid contact examples include, but are not limited to, conductive polymers, carbon materials, metal nanoparticles, hydrogels containing redox active species, and polymers containing redox active species.

In various embodiments, the ion-sensitive phase contains ionophore as the recognition element for ionic analytes. Any uncharged or charged molecules that bind analyte ions can be used as an ionophore. Preferred ionophores, according to various embodiments, can be hydrophobic ionophores that will stay within the ion-selective phase without significant leaching into the sample. Examples of ionophores that may be used include, but are not limited to, hydrogen ionophore I, valinomycin, nonactin, calcium ionophore I, calcium ionophore II, calcium ionophore IV, potassium ionophore I, potassium ionophore III, sodium ionophore X, sodium ionophore VI, magnesium ionophore I, magnesium ionophore III, magnesium ionophore IV, nitrate ionophore VI, nitrite ionophore I, nitrite ionophore VI, and mercuracarborand. According to one or more embodiments, the content range of ionophore can be, for example, from 0.1 to 20 wt %, can preferably be 0.5 to 2 wt % in the ion-sensitive phase.

In preferred embodiments, the ion-sensitive phase further contains an ion exchanger. Representative examples of ion exchangers include, but are not limited to, salts of tetraphenylborate derivatives and quaternary ammonium salts. The content of ion exchange can range, for example from 0.1 to 20%, and in embodiment a preferable range can be 0.5 to 1.5% in the membrane.

The ion-sensitive phase may contain an ionophore without an ion exchanger, an ion exchanger without an ionophore, and may contain both ionophore and ion exchanger. For example, chloride ion-selective membrane may only contain a quaternary ammonium type ion exchanger such as tridodecylmethylammonium chloride without a specific ionophore.

In some embodiments, the ion-sensitive phase may further contain a hydrophobic salt. Representative examples of the hydrophobic salt include tetradodecylammonium tetrakis(4-chlorophenyl) borate and an ionic liquid. Representative examples of The content of the hydrophobic salt ranges from 0.01 to 50%, preferably 0.2 to 5% in the membrane.

As used herein, the "reference electrode" is an electrode that is not responsive to an analyte to a significant extent and provides a relatively constant potential. Various known reference electrode developed in the area of electrochemistry may be used here. The reference electrode comprises an electron conductor covered by a reference membrane. Example reference electrodes can include at least three types. First, Ag/AgCl as the electron conductor of the reference electrode can be immersed in a solution or hydrogel containing one or more chloride salts. The salt can be fully dissolved or oversaturated. Second, Ag or Ag/AgCl as the electron conductor for the reference electrode can be covered by a polymer containing one or more chloride salts. In an embodiment, the salt is not necessarily fully dissolved. Third, a metal or carbon-based electron conductor can be covered by a water-immiscible solvent, plasticizer, polymer, or their combinations containing hydrophobic salts (the so-called "liquid-junction-free" reference electrodes). Overall, representative examples of the electron conductor for the reference electrode include silver coated with silver chloride, metal, carbon-based materials, semiconductors, and conductive polymers. The electron conductor can be of various shapes such as but not limited to wire, rod, needle, array, and planar layer. Example materials to make the reference membrane can include hydrogel, plasticizer, plasticizer mixed with nanoparticles, plasticizer mixed with polymers, silicone rubber, photocured polymer, polymethacrylate, polyvinyl butyrate, polyvinyl chloride, polyvinyl acetate, and/or ionic liquid. The reference membrane can be a deposited membrane or a segment of solution/material, among other possible geometries. In an embodiment, the reference membrane can contain chemicals that aid in establishing a relatively constant and sample-independent potential. Representative examples of chemicals for the reference membrane include, but are not limited to, inorganic salts, ionic liquid, and hydrophobic salts. In one or more embodiments, preferred inorganic salts can include, for example, chloride salts. The concentration of these reference chemicals can range, for example and without limitation, from $10^{-6}$ to 5 M and in various embodiments, a preferable range can be from 0.1 to 3 M. The chemicals for reference membranes may also be saturated or oversaturated. According to an exemplary general embodiment, an SCE sensor can include an indicator electrode and a reference electrode. The indicator electrode can include an indicator electron conductor that can be coupled to an ion-selective membrane, and the reference electrode can include a reference electron conductor that can be coupled to a reference membrane. The ion-selective membrane and the reference membrane can each include a surface configured to interface an aqueous sample, e.g., a drop of blood, and the surfaces can be arranged in a spatial relation enabling them to concurrently contact the aqueous sample. An example SCE sensor according to this general embodiment also includes a particularly configured calibration bridge, coupled to the ion-sensitive phase (not the indicator electron conductor) of the indicator electrode and to the reference phase (not the reference electron conductor) of the reference electrode. In this general embodiment, the combination of the calibration bridge's coupling to the indicator electrode and to the reference electrode and ion or electron carrying features establishes, prior to placing the sample in the SCE sensor, a pre-measurement electrochemical signal between the sensor's reference electrode and indicator electrode. In some embodiments, the calibration bridge includes an ion-conducting phase. Representative materials for an ion-conducting phase include, but are not limited to, aqueous solution, hydrogel, and conducting polymer. The ion-conducting phase may further contain inorganic salts or organic salts or both at a concentration range of $10^{-8}$ to 5 M. An example preferred concentration range can be $10^{-3}$ to 1 M. Example salts can include sodium chloride, potassium chloride, lithium acetate, and/or ionic liquid, and/or combinations thereof. In some embodiments, the calibration bridge can be an electron-conducting phase. Materials forming the electron conducting phase can include, for example and without limitation, metal, carbon-based materials, and conductive polymers.

According to various embodiments, the ion-conducting or electron-conducting phase that forms the calibration bridge is configured in electrical contact with both the ion-sensitive phase and the reference phase, but is separated from the added aqueous sample, e.g., drop of blood. In some embodiments, the calibration phase is separated from the aqueous sample by a water-impermeable material. In some embodiments, the water-impermeable separation material can be formed as a tube made, for example, of glass or polymer to prevent the calibration phase from mixing with the aqueous sample. In some embodiments, the calibration phase can be covered by a layer of water-impermeable coating, such as a polymer coating, that does not allow significant mixing of the calibration phase and the aqueous sample. In some embodiments, the calibration bridge is a metal wire coated with an insulating layer except for two ends exposed. As used herein, "water-impermeable" is defined as a water uptake of below 20% at room temperature. Examples of water-impermeable barrier materials between the calibration phase and the sample include, but are not limited to, polymer, glass, and ceramic. The contact area between the calibration phase and the ion-sensitive phase and reference phase ranges from 1 $\mu m^3$ to 10 $cm^3$, and an example preferable range can be 10 $\mu m^3$ to 10 $mm^3$.

Representative examples of the electrochemical signal used for the quantification of the analyte include potential (voltage), current, conductivity, impedance, and/or charge, and combinations thereof. The calibration bridge can provide a baseline of electrochemical signal such as potential (voltage), current, conductivity, impedance, charge, and their combination prior to the sample being introduced. Voltage or current may be applied to the sensor with the calibration bridge to get a baseline of another electrochemical signal. The potential can be an open-circuit potential or a potential under an applied current. In various embodiments, open-circuit potential (also called electromotive force (EMF)) is used as the electrochemical signal. In such embodiments, the presence of the calibration bridge establishes a pre-measurement baseline of EMF. In operations according to disclosed embodiments, addition of the aqueous sample changes the EMF by a delta. As used herein "addition of the sample," in the context of measuring the aqueous sample by an SCE sensor according to disclosed embodiments, means placement or other introduction of an aqueous sample into the SCE sensor in a manner effecting the sample having concurrent contact with both the ion-sensitive phase and the reference phase. In measurement processes according to various embodiments, the delta EMF from the baseline after the sample addition is used to quantify the analyte in the sample. The baseline EMF can vary from SCE sensor to SCE sensor, irrespective of the devices being fabricated according to identical specifications. However, in SCE sensors according to this general embodiment the variations in baseline EMF are of no consequence, because the delta EMF to the potential upon introduction of the sample is consistent among multiple SEC sensors.

Features and benefits of the above-described calibration bridge and operations thereof include, among other features and benefits, removal of the costly requirement of fluidics-based pre-measurement calibration that attaches to conventional electrolyte measurement devices. Traditional calibration relies on delivering a calibration solution and then removing the solution and rinsing the fluidic system before the sample is introduced to the device (calibration prior to sample testing) or delivering a calibration solution after sample testing and system rinsing (sample testing prior to calibration). In contrast, the SCE sensing according to disclosed embodiments eliminates the requirement for delivering the calibration solution, the requirement for removing the calibration solution, and the requirement for rinsing the fluidic system to prevent contamination of the sample by residual calibration solution or contamination of the calibration solution by the residual sample, because the calibration bridge does not need to be removed for measuring the sample (sample and calibration phase can co-exist). The electrochemical response to the analyte in the sample is not compromised or at least not eliminated by the presence of the calibration bridge.

The SCE sensors are distinguished from prior arts by allowing a baseline of electrochemical signal, which corrects for most sensor-to-sensor variations. In traditional ion-selective electrodes, there is no baseline electrochemical signal.

The analyte of the SCE sensors using ion-sensitive phases includes ionic species and non-ionic species. Representative examples of ionic species include proton, sodium ions, potassium ions, calcium ions, magnesium ions, lithium ions, chloride, nitrate, nitrite, phosphate, fluoride, bicarbonate, carbonate, creatine cation, protamine, heparin, and organic ions. Ionic species directly cause electrochemical response on the ion-sensitive phase. Some non-ionic species such as phenol and boronic acid at near-neutral pH can also induce electrochemical signal on ion-sensitive phases (J. Am. Chem. Soc. 1998, 120, 13, 3049-3059; Anal. Chem. 2014, 86, 4, 1927-1931) and therefore are detectable by the SCE sensors. Based on the electrochemical response of ionic or non-ionic species on ion-selective electrodes, indirect detection of antigens via immunoassay, nucleic acids via nucleic acid hybridization assay, and aptamer targets via aptasensing have been reported (Analytical Chemistry 2014, 86, 4416-4422; Analytical Chemistry 2013, 85, 1945-1950; Analytical Chemistry 2012, 84:2055-2061). SCE sensors according to disclosed embodiments can also detect these analytes and provide improved sensor-to-sensor consistency. The precision and accuracy of any previous sensing applications of electrodes using ion-sensitive membranes (often named "ion-selective electrode," "ion-selective electrode potentiometry," or "potentiometry") are expected to be improved by the self-calibration strategy.

In some embodiments, the SCE sensors can be amperometric sensors comprising an indicator electrode, a reference electrode, and a calibration bridge that couples to the indicator electrode and reference electrode, and an optionally counter electrode. Representative examples of the indicator electrode include carbon or metal-based electrodes. These electrodes can be further modified by functional materials such as, but not limited to, enzyme, antibodies, aptamers, molecularly imprinted polymers, nanomaterials, and polymers for chemical sensing with enhanced sensitivity and/or selectivity. Various reference electrodes developed in the area of electrochemistry can be used as the reference electrode. The counter electrode can be, for example, a metal or carbon material. In amperometric sensors, voltage is applied to the indicator electrode relative to the reference or counter electrode to induce electric currents generated by an analyte. The analyte can be redox active so that it can generate currents because of its oxidation or reduction. The analyte can also be converted to redox active species that can generate currents on the indicator electrode. Representative examples of the analyte include, but are not limited to, glucose, lactate, creatine, cholesterol, ethanol, hydrogen peroxide. A calibration phase can be a solution or gel or polymer that contains a known concentration of analyte. This calibration phase couples to the indicator electrode and reference or counter electrodes without shorting them. The calibration bridge allows for a baseline current prior to the sample measurements. After the sample addition, the change in the current relative to the baseline current can be used for quantification, in contrast to traditional amperometric sensors that uses only a reading from the sample.

EXAMPLE 1

Figure 1B:
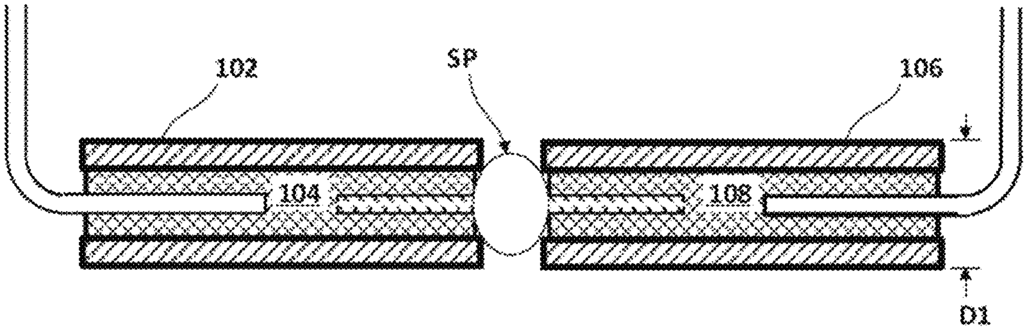
FIG. 1B is a graphic showing the FIG. 1A SCE sensor with an illustrative sample.

FIG. 1A is a graphic that shows, from a two-dimensional cross-cut projection, an example arrangement of structure of a liquid phase SCE sensor 100 according to one or more disclosed embodiments. FIG. 1B show a graphic representation of the FIG. 1A SCE sensor with an illustrative sample, labeled "SP" in the figure, having been introduced.

The liquid phase SCE sensor 100 includes a sensing oil carrying segment 102 that encloses a three-dimensional (3D) interior space, which carries a volume of sensing oil 104. Spaced a separation distance SD from the sensing oil carrying segment 102 is a reference oil carrying segment 106, which encloses another 3D interior space. Carried within the 3D interior space of the reference oil carrying segment 106 is a reference oil 108. A capillary tube 110 extends into a first open end of the sensor oil carrying segment 102 and into its encompassed volume and into the sensing oil 104. The capillary tube 110 second end extends into a first open end of the reference oil carrying segment 106 and into the reference oil 108. The capillary tube 110 defines an inner channel 110A that is configured to carry a concentration of salts between the tube first end and the tube second end.

The sensing oil 104 can be configured as a first plasticizer phase, and the reference oil 108 can be configured as a second plasticizer phase. In accordance with various embodiments, the capillary tube 110 can be configured to provide an ion-conducting phase channel that carries ions, and is coupled to and is configured to establish a baseline potential between the sensing oil 104, e.g., the first plasticizer phase, and the reference oil 108, e.g., the second plasticizer phase.

According to a general embodiment the sensor oil carrying segment 102 can include a first electron conductor 112 and can comprise a first ion-to-electron transducer that couples the first electron conductor 112 to the sensing oil 104. The reference oil carrying segment 106 can include a second electron conductor 114 and can include a second ion-to-electron transducer that couples the second electron conductor 114 to the reference oil 108.

For purposes of description the example sensing oil carrying segment 102, with its first electron conductor 112 and sensing oil 104, can be collectively referenced as an example "indicator electrode" and the example reference oil carrying segment 106, with its second electron conductor 114 and reference oil 108, can be collectively referenced as an example "reference electrode."

Referring to FIG. 1A, the sensor oil carrying segment 102 can provide, e.g., via an outer tube wall, a first containment wall, that partially surrounds and forms an opening to the first volume. The sensing oil 104 can, as visible, be least partially supported in the first volume by the first containment wall. The sensing oil 104 can be configured to form an outer surface, and at least a portion of the sensing oil 104 outer surface can be aligned with the opening to the first volume. The surface of the sensing oil 104 aligned with the opening and can form a sample first contact surface, which is labeled 104A in the FIG. 1 enlarged area. The reference oil carrying segment 106 can provide, via another outer tube, a second containment wall, which partially surrounds and forms an opening to the second volume. As visible in the enlarged area of FIG. 1A, the reference oil 108 can be configured to form another outer surface, and at least a portion of the reference oil 108 outer surface can be aligned with the opening to the first volume, forming a sample second contact surface, which is labeled 108A in the FIG. 1 enlarged area and spaced by the distance SD from the sample first contact surface 104A.

In an implementation a silicone rubber tubing can form the form the sensor oil carrying segment 102 and another silicone rubber tubing can form the reference oil carrying segment 106. As visible in the enlarged area of FIG. 1A, the reference oil 108 can be configured to form another outer surface, and at least a portion of the reference oil 108 outer surface can be aligned with the opening to the first volume, forming a sample second contact surface, which is labeled 108A in the FIG. 1 enlarged area and spaced by the distance SD from the sample first contact surface 104A. sensor oil carrying segment 102 and another silicone rubber tubing can form the reference oil carrying segment 106. The respective silicone rubber tubing can have a mutually identical inner diameter D1 and a mutually identical outer diameter D2. A non-limiting example inner diameter D1 can be 1.02 mm and a non-limiting outer diameter D2 can be 2.16 mm. The inner diameter D1 can also be larger than 1.02 mm or smaller than 1.02 mm, and the outer diameter D1 can be larger than 2.16 mm or smaller than 2.16 mm. A non-limiting example length of the sensing oil carrying segment 102 can be 1-cm and the length of the reference oil carrying segment 106 can be, but is not necessarily, identical.

A non-limiting example spacing SD can be 3 mm, and this example spacing SD value accommodates a sample volume of <10 μL. In an implementation according to the example dimensions the sensor oil segment 102 can accommodate approximately 9 μL of liquid.

In practices according to disclosed embodiments, the capillary tube 110 can be a fused silica capillary tube, having an outer diameter D3 and an inner diameter D4. Various diameters D3 of such capillary tubes are available from various commercial vendors, e.g., Molex. Examples of different inner diameters D4 include, as illustration and without limitation, values ranging from approximately 25 micrometers to approximately 1000 micrometers, the contact area for the calibration solution can be adjusted.

According to one or more embodiments, an optional feature, for example for reducing probability of wicking plasticizer oil into the capillary tube 110, can be a thickening agent, for example but limited to fumed silica, mixed with the plasticizer. An example fused silica and amount thereof can be, but is not limited to, 10-40 mg/mL fumed silica powders with silicone-treated hydrophobic surfaces. Regarding the first electron conductor 112 for the sensing oil carrying segment 102 and the second electron conductor 114 for the reference oil carrying segment 106, each can be, but is not necessarily Au or Pt wire. PEDOT can be used as an ion-to-electron transduction layer (the so-called "solid contact" ion-selective electrodes) between the electron conductor (112 or 114) and the plasticizer oil. Unmodified Au or Pt wires or other electron conductors can be used directly with the plasticizer, for contact-free ISE configurations (the so-called "coated-wire electrodes"). A hydrogel or solution with salts can be used to replace PEDOT to establish a "liquid contact" between the electron conductor and the plasticizer.

The capillary tube 110 can be filled, for example and without limitation, with 0.1 M NaCl or 0.1 M KCl prior to insertion into the sensing oil 104 and the reference oil 108. An example sensing oil 104 can be, but is not limited to, 2-nitrophenyl octyl ether (NPOE), which is a plasticizer, and can include, for example and without limitation, a dissolved valinomycin as the potassium ionophore and potassium tetrakis [3,5-bis(trifluoromethyl)phenyl]borate as the cation exchanger.

In a general embodiment, the reference oil 108 can but does not necessarily include NPOE containing 1 wt % 1-methyl-3-octylimidazolium bis(trifluoromethylsulfonyl) imide, which can provide functionality aspects comparable to a liquid-junction-free reference electrode. The reference oil 108 can also include hydrogel containing salts, which can couple with an Ag/AgCl wire to form a reference electrode. Representative examples of such salt include, but are not limited to, potassium chloride and sodium chloride. According to various embodiments, the reference oil 108 can consist of two volume portions or segments which, for purposes of description can be referred to as reference oil first segment and reference oil second segment. The reference oil first segment can be in contact with the second electron conductor 114, and can contain a chloride salt. The reference oil second segment can interface the sample, e.g., a blood sample, and can contain lithium acetate. SCE sensors according to various embodiments that include the reference oil first segment and the reference oil second segment can provide a mimicking of the "double junction" reference electrode. One representative example of hydrogel is polyethylene glycol diacrylate (PEGDA).

Also, in a general embodiment, hydrophobic fumed silica nanoparticles can be added in both the sensing oil 104 and the reference oil 108, for further prevention of wicking of either of the oils into the capillary tube 110.

EXAMPLE 2

Figure 2:
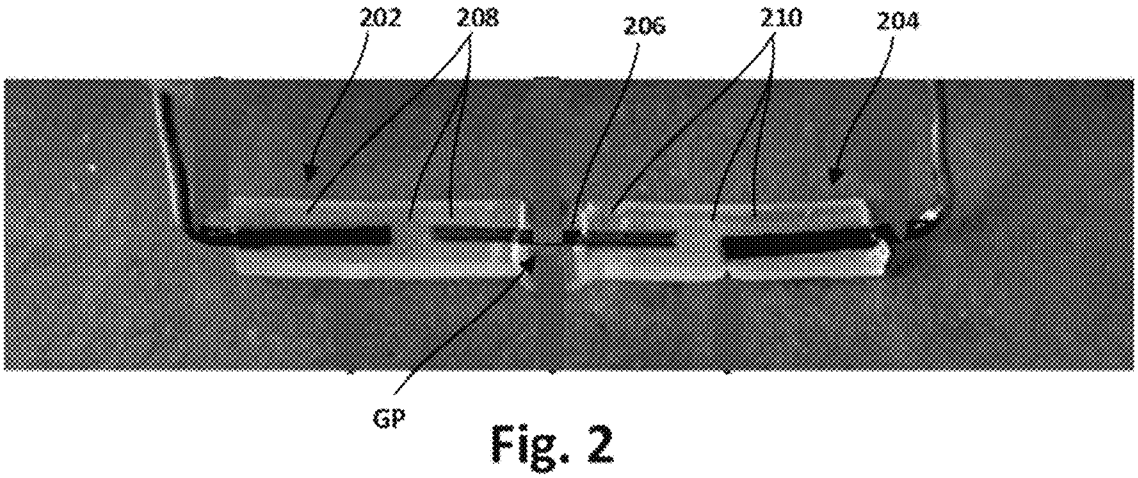
FIG. 2 is a captured image of a constructed example liquid phase SCE sensor according to one or more disclosed embodiments.

FIG. 2 shows a captured image of a constructed example liquid phase SCE sensor 200 according to one or more disclosed embodiments. The example liquid phase SCE sensor 200 includes a silicone rubber tubing first segment 202 and second segment 204, each being 1 cm in length having an inner diameter of 1.02 mm and an outer diameter of 2.16 mm. The 1-cm-long tube accommodates approximately 9 μL of liquid. A gap GP of approximately 3 mm is between the first segment 202 and second segment 204, two tubes requires a sample volume of <10 μL. A capillary tube 206 filled with 0.1 M NaCl is inserted into the sensing oil 208 within the first segment 202 and the reference oils within the second segment 204. The sensing oil 208 is 2-nitrophenyl octyl ether (NPOE, a plasticizer) with dissolved valinomycin as the potassium ionophore and potassium tetrakis [3,5-bis(trifluoromethyl)phenyl]borate as the cation exchanger. The reference oil 210 is NPOE containing 1 wt % 1-methyl-3-octylimidazolium bis(trifluoromethylsulfonyl)imide, which is based on the recently developed concept of liquid-junction-free reference electrodes using ionic liquid-doped plasticizer phases. Twenty mg/mL hydrophobic fumed silica nanoparticles are added in both oils to prevent any wicking of the oil into the capillary tube 206. It will be understood that the 1 cm length, 1.02 mm inner diameter, and 2.16 mm outer diameter of the silicone rubber tubing first segment 202 and second segment 204 are only examples, and are not intended as any limitation or any indication of preference regarding practices according to disclosed embodiments.

EXAMPLE 3

Figure 3A:
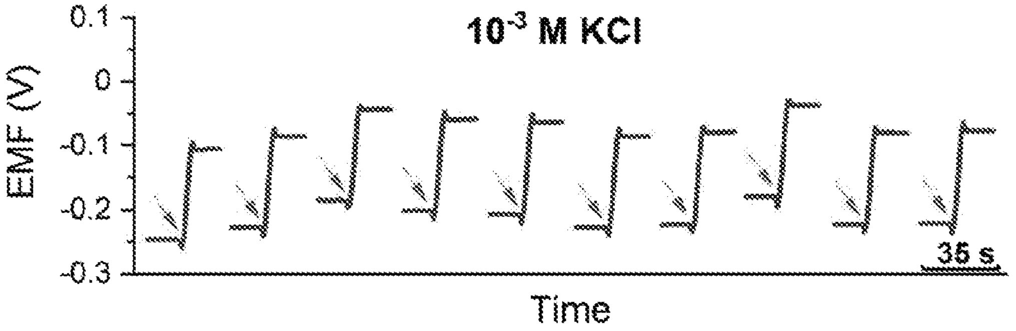
FIGS. 3A and 3B are graphs showing electromotive force (EMF) versus time measurements of $K^+$ levels, using a physical, constructed $K^+$ configured liquid phase SCE sensor according to one or more disclosed embodiments.
Figure 3B:
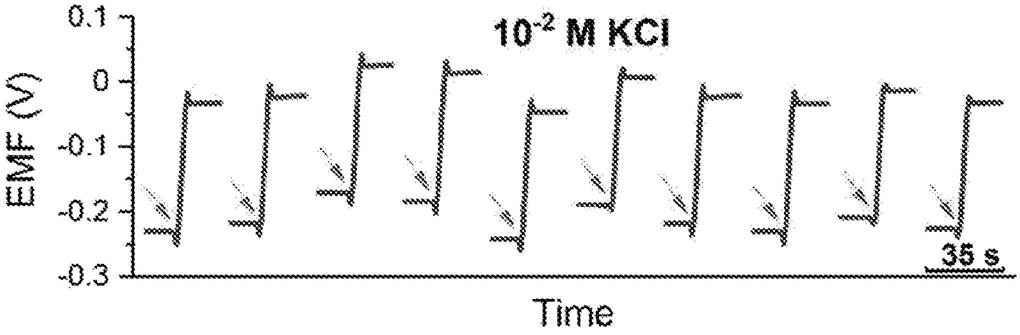

FIGS. 3A and 3B are graphs showing electromotive force (EMF) versus time measurements of $K^+$ levels, using a physical, constructed $K^+$ configured liquid phase SCE sensor according to one or more disclosed embodiments. FIG. 3A shows results of the K+ SE sensor upon addition of 8 IL of 10-3 M KCl solutions and FIG. 3B shows results upon addition of 10-2 M KCl solutions in 20 trials using 20 different sensors. A 15-s baseline was recorded before the sample addition for the calibration purpose. The arrow indicates the sample addition. FIGS. 3A and 3B each show results of measurements using integer 10 K+, i.e., a total of integer 20 sensors. As can be seen, the measured baseline potential difference, or starting EMF, varies by tens of mV. The addition of 10-3 M KCl solution, as shown in FIG. 3A, and 10-2 M KCl solution, as shown in FIG. 3B, induces an EMF increase of 143.0±1.4 mV and 196.1±1.2 mV respectively, representing a dramatically improved sensor-to-sensor consistency compared to traditional ion-selective electrodes using the absolute EMF without a baseline.

The much smaller range of standard deviations of the additional potential (delta potential) shows the calibration capability of the baseline provided by practices in accordance with disclosed embodiments and may be further reduced by optimizing experimental conditions such as enhancing the homogeneity of the viscous plasticizer-silica solutions. Notably, the difference between the EMF value of 10-3 M (activity is 0.964×10-3 M) and 10-2 M (activity is 0.899×10-2 M) KCl is 53.1 mV, very close to the theoretical response of 56.2 mV (not 59.2 mV) based on the Nernstian equation. These results show an additional feature and advantage of SCE sensors in accordance with disclosed embodiments, which is that the calibration solution, e.g., in the FIG. 1A calibration channel 110A, does not significantly affect the EMF reading of the added sample and does not need to be removed. This shows a significant difference between the disclosed SCE sensors and traditional calibration methods.

EXAMPLE 4

FIGS. 4A-4E illustrate steps in an example process 400 for fabricating a planar SCE sensor according to a disclosed embodiments. FIG. 5A is a graphic that shows a top elevation view of the FIG. 4E example configuration of an all-solid-state, SCE sensor according to one or more disclosed embodiments. FIG. 5B shows features of the FIG. 5A example configuration as viewed from the figure's cross-cut projection BB-BB. FIG. 5C shows features of the FIG. 5A example configuration as viewed from the figure's cross-cut projection CC-CC.

For purposes of description, one area of the substrate 402 will be referenced as a "sensor area," and an adjacent area will be referenced as a "reference area." Subsequent layers formed in operations visible in FIGS. 4B through 4E will therefore be described as configured according to being a sensor membrane related or reference membrane related structure.

Figure 4A:
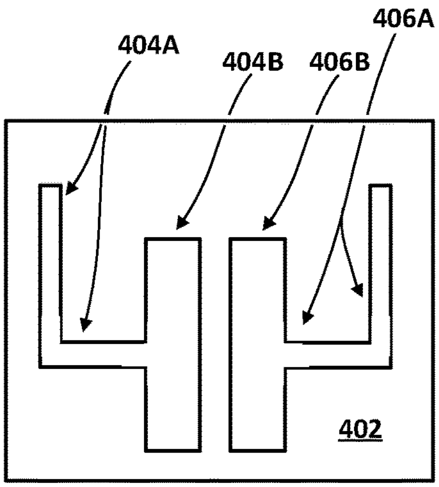
FIGS. 4A-4E illustrate steps in an example process for fabricating an all-solid-state, SCE sensor according to a disclosed embodiments.

Referring to FIG. 4A, nanometer-thick Cr/Au layers can be deposited onto a plastic sheet 402 (e.g., PET) via electron-beam evaporation. The electrode pattern can be defined by a shadow mask made of stainless steel. The electrode pattern can include a first metal layer element 404A-404B, of which the respective portions 404A and 404B will be referenced as a "first electrode device electron conductor layer element 404A," and a "first electrode device membrane metal layer element 404B." The electrode pattern can further include a second metal layer element 406A-406B, of which the respective portions 406A and 406B will be referenced as a "second electrode device electron conductor layer element 406A," and a "second electrode device membrane metal layer element 406B." In an example implementation, the second metal layer element 406A-406B can comprise the same metal as the first metal layer element 406A-406B, e.g., Cr/Au metal.

Figure 4B:
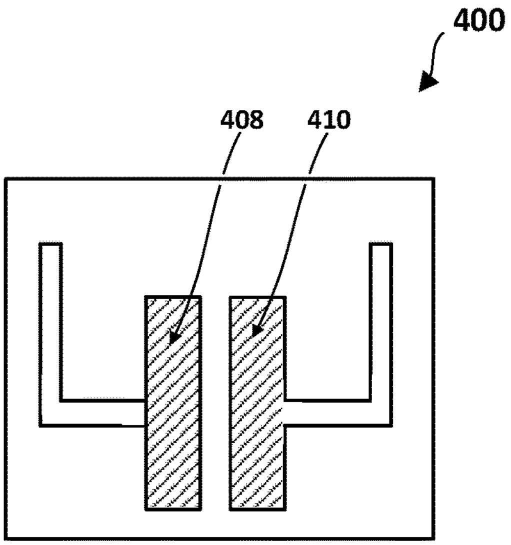

Referring to FIG. 4B, a solid contact layer process of PEDOT:PSS can be generated on the sensing area and reference area, e.g., by galvanostatic electropolymerization after manual covering of other Au areas, for example, with room temperature vulcanizing (RTV) silicone. The resulting structure is shown as a sensing area solid contact 408, which is supported above the sensor area first electrode device membrane metal layer element 404B, and a reference area solid contact 410 supported above the reference area second electrode device membrane metal layer element 406B.

Figure 4C:
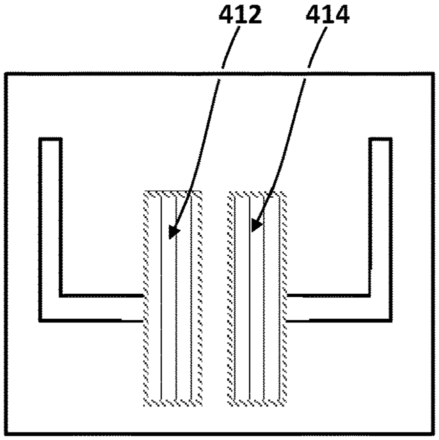

Referring to FIG. 4C, a first plasticized polymer membrane 412, i.e., the sensing membrane 412, is formed above the sensing area solid contact 408 and a second plasticized polymer membrane 414, i.e., the reference membrane 414, is formed above the reference area solid contact 410. The cocktail for the sensing membrane 412 can be prepared by dissolving a mixture of plasticizer (NPOE or DOS), high molecular weight PVC, ionophore, and ion exchanger in tetrahydrofuran. The ratio of PVC to plasticizer can be, for example, lower than 1:2 to ensure a low membrane resistance. The sensing membrane can be disposed by 3D printing, direct ink writing of plasticized PVC gels from tetrahydrofuran solutions has been studied for the 3D printing of actuators. The sensing membrane can comprise, for example, one layer or two layers of plasticized PVC, and the thickness can be, for example, hundreds of μm. Printing configuration can be application-specific and in some applications fast ink solidification may not be required. The fabrication of the second plasticized polymer membrane 414, i.e., reference membrane 414, can be identical to the above-described fabrication of the sensing membrane, except that the hydrophobic electrolyte can be the functional dopant.

Figure 4D:
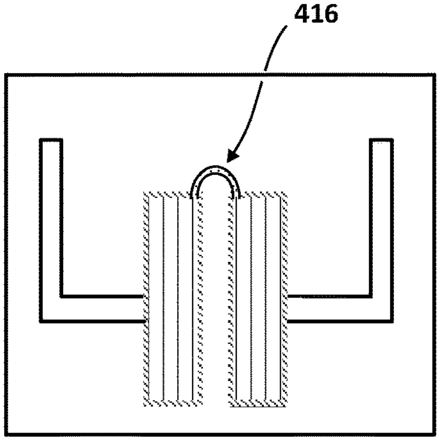

Referring to FIG. 4D operations can proceed to forming a solid calibration phase 416. In an example configuration the solid calibration phase 416 can include ethylene glycol diacrylate EGDA loaded with 0.5-2 wt % photoinitiator (diphenyl(2,4,6-trimethylbenzoyl) phosphine oxide) can be mixed with a 0.1-1.0 M NaCl or KCl solution in a volume ratio of 4:1 to 1:1. This hydrogel solution can be dispensed by the 3D printer and may be simultaneously solidified by a UV curing system. An example curing wavelength can be, but is not limited to being, 380 nm-410 nm. The 3D printing can use a stainless-steel nozzle, which can have an inner diameter of, for example and without limitation, 100 μm. The photocured product will be polyethylene glycol diacrylate (PEGDA) hydrogel. These and adaptations of these configurations can readily obtain a hydrogel line with a width and height of approximately 50 to 500 μm. Instead of using a hydrogel containing salts, this calibration bridge can also be an electron conductor, for example and without limitation, silver paste, graphene-polycaprolactone ink, and graphene-epoxy ink.

Figure 4E:
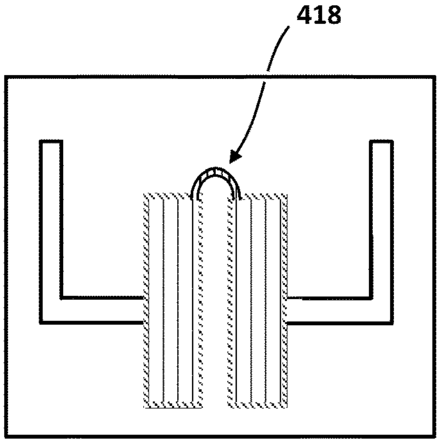

Referring to FIG. 4E, an RTV silicone rubber 418 can be printed. Printing configuration can be application-specific, and examples include, without limitation, a large diameter printing nozzle, e.g., 200 μm or 300 μm, to cover all exposed PEGDA (polyethylene glycol diacrylate) surfaces. A non-limiting example RTV silicone rubber can be Loctite (TM) SI 595 CL, or equivalents. This can reduce a likelihood of dehydration during storage, as well as extend storage life, and can reduce a probability of mixing with the sample during use.

FIG. 5A shows a duplicate of FIG. 4A, annotated to show a first cross-cut projection BB-BB, on a plane normal to the plane of the substrate 402 of FIG. 4A. FIG. 5B shows features of the FIG. 5A example configuration as viewed from the figure's cross-cut projection BB-BB. FIG. 5C shows features of the FIG. 5A example configuration as viewed from the figure's cross-cut projection CC-CC. A crosshatch legend is included.

It is noted that, as used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. As will be apparent to those of skill in the art upon reading this disclosure, each of the individual embodiments described and illustrated herein has discrete components and features which may be separated from or combined with the features of any of the other several embodiments without departing from the scope or spirit of the present invention. Any recited method can be carried out in the recited order of events or in any other order that is logically possible. Where a range of values is provided, it is understood that each intervening value, to the tenth of the unit of the lower limit unless the context clearly dictates otherwise, between the upper and lower limit of that range and any other stated or intervening value in that stated range, is encompassed within the range. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. While exemplary embodiments of the present invention have been disclosed herein, one skilled in the art will recognize, upon reading this disclosure in its entirety, that various changes and modifications may be made without departing from the scope as defined by the following claims.

What is claimed is:

1. A self-establishing baseline electrochemical signal based self-calibrated electrochemical (SCE) sensor, comprising:

an indicator electrode, comprising an ion-sensitive phase coupled to a first electron conductor and forming a sample first contact surface configured to interface an aqueous sample;

a reference electrode, comprising a reference phase coupled to a second electron conductor and forming a sample second contact surface configured to interface the aqueous sample, spatially arranged relative to the indicator electrode such that the sample first contact surface and the sample first contact surface are spaced apart by a space and, when the aqueous sample is in the space, are in concurrent interfacing contact with the aqueous sample; and a calibration bridge, extending between and coupled to the reference electrode and the indicator electrode, and configured to establish, without the aqueous sample being in the space and irrespective of the aqueous sample being in the accommodating space, a baseline electrochemical signal between the indicator electrode and the reference electrode, the calibration bridge comprising:

a conducting phase channel, extending between and electrically coupled to the reference phase of the reference electrode and the ion-sensitive phase of the indicator electrode and comprising an ion-conducting phase or an electron-conducting phase, the ion-conducting phase or the electron-conducting phase being configured to establish the baseline electrochemical signal in response to the conducting phase channel extending between and being electrically coupled to the reference phase of the reference electrode and the ion-sensitive phase of the indicator electrode, and a channel support and separation structure, extending between the reference electrode and the indicator electrode and configured to support the conducting phase channel and comprising a barrier or being configured to form a barrier, the barrier being configured to prevent mixing of the conducting phase channel with the aqueous sample when in the space.

2. The self-establishing baseline electrochemical signal based SCE sensor of claim 1, wherein the ion-sensitive phase comprises a water immiscible material containing one or more sensing chemicals.

3. The self-establishing baseline electrochemical signal based SCE sensor of claim 2, wherein:

the water-immiscible material is selected from the group consisting of plasticizers, organic solvents, polymers, and combinations thereof, and the sensing chemical is selected from the group consisting of ionophores, ion exchangers, hydrophobic salts, ionic liquids, and combinations thereof.

4. The self-establishing baseline electrochemical signal based SCE sensor of claim 1, wherein:

the first electron conductor is selected from the group consisting of metals, carbon-based materials, semiconductors, and conductive polymers.

5. The self-establishing baseline electrochemical signal based SCE sensor of claim 1, wherein the ion-sensitive phase is coupled to the first electron conductor by a coupling that comprises an ion-to-electron transducer or is coupled to the first electron conductor via direct coating of the ion-sensitive phase onto the first electron conductor.

6. The self-establishing baseline electrochemical signal based SCE sensor of claim 5, wherein: the ion-to-electron transducer is selected from the group consisting of conductive polymers, carbon-based materials, metal nanomaterials, metal-organic frameworks, semiconductors, redox-active chemicals, hydrogels containing salts, and aqueous solutions containing salts.

7. The self-establishing baseline electrochemical signal based SCE sensor of claim 1, wherein the reference phase comprises a water-immiscible material containing a hydrophobic salt.

8. The self-establishing baseline electrochemical signal based SCE sensor of claim 7, wherein the water-immiscible material is selected from the group consisting of plasticizers, organic solvents, polymers, and combinations thereof.

9. The self-establishing baseline signal electrochemical based SCE sensor of claim 7, wherein the hydrophobic salt is an organic salt or a combination of organic salts.

10. The self-establishing baseline electrochemical signal based SCE sensor of claim 1, wherein the reference phase comprises a hydrogel containing one or more salts or comprises an aqueous solution containing one or more salts.

11. The self-establishing baseline electrochemical signal based SCE sensor of claim 10, wherein the hydrogel has a homogenous part containing salts or the aqueous solution has a respective homogenous part containing salts.

12. The self-establishing baseline electrochemical signal based SCE sensor of claim 10, wherein the hydrogel comprises a hydrogel first part that is coupled to the second electron conductor and a hydrogel second part that interfaces, via the sample second contact surface, with the received aqueous sample in the spacing, the hydrogel first part containing a salt and the hydrogel second part containing a different salt.

13. The self-establishing baseline electrochemical signal based SCE sensor of claim 10, wherein:

- the aqueous solution comprises an aqueous solution first part, which is coupled to the second electron conductor, and an aqueous solution second part, which interfaces with the aqueous sample,
- the aqueous solution first part contains a respective salt,
- the aqueous solution second part contains a respective different salt, and
- the barrier structure of the calibration bridge comprises a barrier material and is configured to separate the aqueous solution first part from the aqueous solution second part, and
- the barrier material is configured to allow slow ion diffusion and not allow fast mixing of the aqueous solution first part with the aqueous solution second part.

14. The self-establishing baseline electrochemical signal based SCE sensor of claim 1, wherein the reference phase comprises a hydrogel containing an inorganic salt or a combination of inorganic salts.

15. The self-establishing baseline electrochemical signal based SCE sensor of claim 1, wherein the reference phase comprises a polymer containing one or more inorganic salts.

16. The self-establishing baseline electrochemical signal based SCE sensor of claim 1, wherein the second electron conductor is selected from the group consisting of metals, silver-silver chloride, carbon-based materials, semiconductors, and conductive polymers.

17. The self-establishing baseline signal electrochemical based SCE sensor of claim 1, wherein the reference phase is coupled to the second electron conductor by a coupling that comprises an ion-to-electron transducer or a direct coating of the reference phase onto the second electron conductor.

18. The self-establishing baseline electrochemical signal based SCE sensor claim 1, wherein the conducting phase channel of the calibration bridge comprises an ion-conducting phase comprising a water, hydrogel, or polymeric phase that is configured to enable diffusion of ionic species.

19. The self-establishing baseline electrochemical signal based SCE sensor of claim 1, wherein the conducting phase channel of the calibration bridge comprises an electron-conducting material.

20. The SE sensor of claim 1, wherein the barrier comprises a material that is configured to prevent intermixing or interfacing of the conducting phase with the aqueous sample when in the space.

21. The self-establishing baseline electrochemical signal based SCE sensor of claim 1, wherein the baseline electrochemical signal includes a combination of two or more different members of the group consisting of potential, current, impedance, conductance, and charge.

22. The self-establishing baseline electrochemical signal based SCE sensor of claim 1, wherein the sample first contact surface and the sample second contact surface are further configured to interface aqueous samples comprising an analyte, the analyte being selected from the group consisting of ionic species, proteins, enzymes, nucleic acids, drugs, phenols, boronic acids, and saccharides.

23. A method for self-establishing baseline electrochemical signal based self-calibrated electrochemical (SCE) measuring an analyte in an aqueous sample, comprising:

- measuring, as a measured baseline electrochemical signal, the baseline electrochemical signal established by the calibration bridge coupled to the indicator electrode and the reference electrode of a self-establishing baseline electrochemical signal based SCE sensor according to claim 1, without any aqueous sample in the space,
- introducing, after the measuring the baseline electrochemical signal, the aqueous sample into the space of the self-establishing baseline electrochemical signal based SCE sensor according to claim 1, in a manner that contact interfaces the aqueous sample to both the sample first contact surface of the ion-sensitive phase and the sample second contact surface of the reference phase,
- measuring an electrochemical signal between the reference electrode and the indicator electrode corresponding to the introducing of the aqueous sample into the space of the self-establishing baseline electrochemical signal based SCE sensor according to claim 1,
- detecting a change between the measured electrochemical signal corresponding to the introducing of the aqueous sample and the measured baseline electrochemical signal, and
- detecting and/or quantifying the analyte in the aqueous sample, based on the detected change between the measured electrochemical signal corresponding to the introducing of the aqueous sample and the measured baseline electrochemical signal.

24. A self-stablishing baseline electrochemical signal based self-calibrated electrochemical (SCE) sensor, comprising:

- an indicator electrode comprising an electron conductor modified with glucose oxidase-based coatings configured for detection of glucose;
- a reference electrode, separated from the indicator electrode by a spacing configured to receive and accommodate an aqueous sample such that the reference electrode and the indicator electrode have concurrent interfacing contact with the aqueous sample; and
- a calibration bridge that extends between and is electrically coupled to the indicator electrode and the reference electrode, and is configured to establish without the aqueous sample in the spacing and irrespective of the aqueous sample being in the spacing, a baseline electrochemical signal between the indicator electrode and the reference electrode, wherein the calibration bridge comprises:

a conducting phase channel, extending between and electrically coupled to the reference electrode and the indicator electrode and comprising an ion-conducting phase or an electron-conducting phase that is configured to establish the baseline electrochemical signal in response to the conducting phase channel extending between and being electrically coupled to the reference electrode and the indicator electrode, and a channel support and separation structure, extending between the reference electrode and the indicator electrode and configured to support the conducting phase channel and comprising a barrier or being configured to form a barrier, the barrier being configured to prevent mixing of the conducting phase channel with the aqueous sample when in the accommodating space.

25. The self-stablishing baseline electrochemical signal based SCE sensor of claim 24, wherein the electron conductor of the indicator electrode is further configured with other materials and redox-active chemicals in addition to glucose oxidase, in a manner configured to improve the performance of glucose sensing.

26. The self-stablishing baseline electrochemical signal based SCE sensor of claim 24, further comprising a water-impermeable barrier that is configured to separate the calibration phase from the received aqueous sample when in the spacing.

27. A self-stablishing baseline electrochemical signal based self-calibrated electrochemical (SCE) sensor, comprising:

an indicator electrode comprising an electron conductor modified with functional coatings configured for detection of specific analytes;

a reference electrode, separated from the indicator electrode by a spacing configured to receive an aqueous sample, as a received aqueous sample, the indicator electrode and the reference electrode being spatially arranged such that, when the received aqueous sample is in the spacing, the reference electrode and the indicator electrode have concurrent interfacing contact with the received aqueous sample; and a calibration bridge that extends between and electrically couples the indicator electrode with the reference electrode and is configured to establish without the aqueous sample in the spacing a baseline electrochemical signal between the indicator electrode and the reference electrode, and to continue the baseline electrochemical signal irrespective of the aqueous sample being in the spacing, wherein the calibration bridge comprises:

a conducting phase channel, extending between and electrically coupled to the reference electrode and the indicator electrode and comprising an ion-conducting phase or an electron-conducting phase, the ion-conducting phase or the electron-conducting phase being configured to establish the baseline electrochemical signal in response to the conducting phase channel extending between and being electrically coupled to the reference electrode and the indicator electrode, and a channel support and separation structure, extending between the reference electrode and the indicator electrode and configured to support the conducting phase channel and comprising a barrier or being configured to form a barrier, the barrier being configured to prevent mixing of the conducting phase channel with the aqueous sample when in the spacing.

28. The self-stablishing baseline electrochemical signal based SCE sensor of claim 27, wherein;

the functional coatings include enzymes, aptamers, nucleic acids, antibodies, molecularly imprinted polymers, nanomaterials, and/or polymers for detection of the specific analytes, and the specific analytes include one or more among glucose, lactate, cholesterol, drugs, nucleic acids, pesticides, antigens, hormones, viruses, bacteria, and metabolites.

29. A method for self-stablishing baseline electrochemical signal based self-calibrated electrochemical (SCE) sensor measuring an analyte in an aqueous sample, comprising:

obtaining, prior to adding the aqueous sample into the spacing of a self-establishing baseline signal based SCE sensor according to claim 24, a baseline current from the SCE sensor according to claim 24 based on the coupling, in the self-establishing baseline signal based SCE sensor according to claim 24, of the indicator electrode and the reference electrode by the conducting phase channel of the calibration bridge, introducing the aqueous sample into the spacing of the self-establishing baseline signal based SCE sensor according to claim 24; and detecting a change, the change being between:

an updated current signal through the indicator electrode and the reference electrode with the aqueous sample in the spacing of the self-establishing baseline signal based SCE sensor according to claim 24, corresponding to the aqueous sample in the spacing, and the baseline current obtained prior to introducing the aqueous sample into the spacing, while continuing the coupling of the calibration phase channel to the indicator electrode and the reference electrode.

30. The method of claim 29, further comprising quantifying a glucose level in the aqueous sample, based on the detected change.

* * * * *